Patented June 27, 1944

2,352,435

UNITED STATES PATENT OFFICE 2,352,435

ORGANIC SULPHUR COMPOUND AND A PROCESS FOR ITS PREPARATION

Johan Marius Hoeffelman and Rinke Berkenbosch, Amsterdam, Netherlands, assignors to Shell Development Company, San Francisco, Calif., a corporation of Delaware No Drawing. Application May 25, 1940, Serial No. 337,324. In the Netherlands June 29, 1939

13 Claims. (Cl. 260—609)

This invention relates to a process for the production of thioethers and/or mercaptans, and it also relates to new and useful thioethers. More particularly, it provides a process for the production of thioethers and/or mercaptans, and in some cases novel thioethers, by reacting unsaturated organic compounds in the presence of organic peroxides and an activating agent selected from a group of particularly effective inorganic salts, with a substance of the general formula RSH where R may be a hydrogen atom, or an organic radical such as an alkyl, alkenyl, alkynyl, aromatic or alicyclic radical, or derivatives thereof.

This invention provides a new and improved method for the utilization of hydrogen sulphide and various organic thiohydroxy compounds to effect the conversion of unsaturated organic compounds, particularly those derived from the petroleum industries, to valuable addition products thereof. By employing an appropriate amount of an unsaturated compound and reacting it with hydrogen sulphide under suitable conditions, we may obtain an addition product substantially predominating in the corresponding mercaptan, or by employing a greater quantity of the unsaturated compound and reacting it under such conditions that the corresponding mercaptan, as it is formed, reacts with additional quantities of the unsaturated compound, we may obtain the corresponding thioether. Also, we may react an unsaturated compound with a thiohydroxy material in the presence of the appropriate catalysts and under suitable conditions obtain a thioether.

It has been observed that while compounds of the general formula R—SH add to unsaturated linkages according to Markownikow's rule in the complete absence of organic peroxides, the presence of such materials in small quantity causes the addition to occur abnormally. Thus, in deviation from Markownikow's rule, the addition takes place on the double bond carbon atom to which the greatest number of hydrogen atoms are attached. Therefore, the reaction taking place in the presence of peroxides offers a direct method for obtaining primary thioethers from hydrocarbons containing a terminal unsaturated carbon atom.

Now we have found that by adding a small quantity of certain particularly effective inorganic salts to the peroxide-containing addition mixture, the addition reaction proceeds substantially more rapidly, and enables the reaction to be executed at practicable rates and at lower temperatures and pressures. The metal salts appear to have an activating effect on the catalytic activity of the organic peroxides, and generally facilitate the production of increased yields of mercaptan, thioether, as well as primary thioether products.

We have also found novel and valuable organic thioethers which may be employed as intermediates for the production of sulphonium compounds which are extensively used as detergents and for other purposes.

The unsaturated organic compounds which may be reacted with hydrogen sulphide or a thiohydroxy compound according to the invention include hydrocarbons which contain one or more olefinic and/or acetylenic linkages. Examples of such hydrocarbons are ethylene, propylene, the butylenes, the amylenes, hexene-1, octene-2, decene-1, cetene-1, styrene, cyclohexene, 3-methyl cyclohexene, 1.4-diphenyl butene-2, butadiene-13, hexadiene-1.4, acetylene, butyne-1, hexyne-1, cetyne-1, octyl acetylene, dimethyl acetylene, phenyl acetylene, diacetylene, di-biphenyl acetylene, etc. and their homologues and analogues. The above compounds, and their various homologues, may be substituted in the nucleus and/or in the substituents in various degrees by straight-chain, cyclic, and heterocyclic radicals, and by such substituents as alkoxy, alkenoxy, alkyloxy, aralkoxy, halogen, alkylimido, etc. The illustrated materials used may be of a highly refined quality, or they may be of technical grades. Also unrefined mixtures, as a vapor phase cracked gasoline, produced by cracking a paraffin wax, are suitable depending upon the type of product desired. When use is made of cracked gasolines or other technical olefine mixtures, it is in general advantageous to subject these to a preliminary refining treatment, which may consist, for example, in a treatment with adsorptive agents, such as clay, fuller's earth, silicagel, bauxite, adsorption carbon and the like, or a distillation over such agents, or a treatment with sulphuric acid, phosphoric acid, aluminum chloride, metallic sodium and the like. It is also possible to apply a combination of various refining agents. During this refining treatment gum-forming substances are probably selectively polymerized and any gum already present is removed, whilst apparently those substances which inhibit the formation of peroxides, are eliminated simultaneously. After the refining treatment the olefine mixtures are preferably redistilled, any higher boiling substances formed being left behind as residue.

Compounds of the above types may be reacted with materials containing the —SH radical in the presence of organic peroxides and certain activating metal salts of strong mineral acids under the proper reaction conditions and thereby converted in good yields to mercaptans and/or thioethers.

In general, thiohydroxy compounds and their derivatives are suitable for the process of the invention, and may be brought into contact with the unsaturated organic materials in the presence of inert diluents and/or solvents for the various reactants. Substances which may be satisfactorily employed according to the process and are typical of the general class are hydrogen sulphide, methyl mercaptan, ethyl mercaptan, propyl mercaptan, isopropyl mercaptan, tertiary butyl mercaptan, allyl mercaptan, 4-thiohydroxy hexene-1, cetyl mercaptan, thiophenol, thiohydroxy cyclohexane, thiocresol, benzyl mercaptan, monothioglycol, thioglycolic acid, etc., and their numerous homologues and analogues. Various substituted thiohydroxy compounds as derivatives of the general class may likewise be used in the process, as ethylene thiochlorhydrin, 1-thiohydroxy-6-chloro naphthalene, 1-methyl-3-nitro-4-thiohydroxy benzene, diethyl thiotartronate, di-parachloro phenyl thiomalate, etc. Likewise, mixtures of thiohydroxy compounds and mixtures with other substances may be employed according to the process. An example is the crude mercaptan mixture obtained in the caustic treatment of cracked distillates of some crude oils. These mixtures may be distilled beforehand in order to remove any higher molecular substances that might be liable to inhibit the desired reaction.

It is well known that unsaturated hydrocarbons and other organic substances on exposure to the atmosphere absorb oxygen and as a result contain peroxides. Ethers, ketones, aldehydes, carboxylic acids in contact with air and/or oxygen and/or oxygen-bearing substances under varying conditions also form peroxides. Unsaturated organic compounds as proposed according to this invention may readily contain peroxides after ordinary storage, and thereby when employed carry into the reaction media peroxide bodies.

Depending upon the nature and source of the materials employed according to the process of this invention, and the mode of operation of the same, peroxides may be introduced to the reaction mixture by the addition of peroxide-containing unsaturated organic compounds, or mixtures thereof, in the course of the process. The peroxides thus added may be augmented with additional quantities of peroxide-containing and/or peroxide-forming chemicals, of technical, or pure qualities, or as by-products of other processes. Examples of suitable peroxides are the peroxides of unsaturated organic compounds, as the olefine peroxides, the peroxides of the ethers, ketones, aldehydes and carboxylic acids, the various aromatic peroxides, such as benzoyl peroxide and tetraline peroxide, and the terpene peroxides, as ascaridol, etc.

As has already been mentioned, these peroxide-bearing substances may be added to the components to be reacted or they may be naturally present therein. They may also occur in the solvents or diluents if they are present. Thus technical ethers and technical dioxane contain peroxides, of which particularly those in dioxane are characterized by great catalytic activity. In general the olefine peroxides were found to be the most suitable and active catalysts.

Suitable activating agents or catalysts are the metal salts of strong inorganic acids which under the conditions of the reaction do not react with the thiohydroxy material and which catalyze the desired addition reaction or reactions. Suitable activating agents are the simple and complex salts of iron, chromium, manganese, molybdenum, vanadium, thorium, uranium, cirium, lanthanum, beryllium, magnesium, aluminum and osmium.

The salts of the above metals and strong mineral acids markedly increase the catalytic effect of peroxides in the addition reaction between thiohydroxy materials and unsaturated hydrocarbons. The salts of the strong inorganic acids have been found to be generally applicable, with the salts of sulphuric acid, phosphoric acid, nitric acid, and the halogen hydracids particularly active. The most active agents were found to be the halides, particularly the chlorides of iron, chromium, magnesium, aluminum, thorium and uranium. The halides of aluminum and trivalent iron are preferably employed in the moist state or in the crystalline water-containing form.

The metal salt activating agents may be used in an anhydrous condition, or they may be used as hydrated crystals with or without occluded moisture or water. They may be employed as finely divided powder, in the form of grains or lumps, or in larger or other suitable sizes or shapes. If desired, they may be used in combination with other substances with or without catalytic effect, if necessary in the form of complex or double compounds. They may also be applied on inert carriers, such as pumice stone, alumina, silica gel, kieselguhr, charcoal, etc.

The process may be carried out according to the standard laboratory or industrial practices. The various reactants and components of the reaction may be brough together substantially simultaneously in the reaction chamber, or they may be so introduced independently or in groups. Depending upon the physical properties of the materials employed, the reaction may be run at atmospheric, superatmospheric, or subatmospheric pressures.

Operating temperatures likewise should be selected according to the natures of materials involved, though the preferable operating temperature is below about 120° C., or less. In general, a preferred operating temperature is from about 20° C. to 120° C., although higher or lower temperature may be used advantageously in some cases. The most advantageous results are generally obtained at temperatures not exceeding about 40° C.

The process may be carried out under multi-phase conditions, but it is preferably executed in the liquid phase. If desired, use may be made of suitable fluid reaction media. These media should possess the characteristics of being substantially liquid under the operating conditions of the reaction, of being inert with the materials employed in the process, and of forming with the reactants a medium in which the activating metal salt agents are insoluble. Substances coming into consideration for media are, for example, unreactive hydrocarbons, such as hexane, octane, benzene and toluene, ethers, such as di-ethyl ether, di-isopropyl ether, dioxane, organic acids and esters, such as glacial acetic acid and ethyl acetate, and halogenated hydrocarbons, such as chloroform and carbon tetrachloride.

Many novel and useful thioethers may be prepared in practicable yields in accordance with the novel process of the invention. A particularly valuable subgroup of such novel thioethers embraces the unsymmetrical thioethers wherein both of the carbon atoms linked directly to the thioether sulphur atom are linked to at least two other carbon atoms and wherein at least one of the organic radicals linked directly to the thioether sulphur atom contains at least eight carbon atoms. For convenience, the thioethers of this subgroup may be represented by the general formula R—S—R$_1$ wherein R and R$_1$ are different saturated or unsaturated hydrocarbon or substituted hydrocarbon radicals at least one of which contains at least eight carbon atoms and both of which are linked to the —S— by carbon atoms which in turn are linked directly to at least two other carbon atoms. It is seen that in these thioethers the sum of the carbon atoms in R and R$_1$ will always be equal to at least eleven, the compound isopropyl secondary octyl thioether representing the lowest member of the subgroup; in general, the most useful members are those wherein the sum of the carbon atoms in R and R$_1$ does not exceed twenty-two. Preferred members within the subgroup are those wherein R is a secondary alkyl radical containing not more than five carbon atoms and R$_1$ is a secondary alkyl group containing at least eight carbon atoms, those compounds where R is the isopropyl radical being particularly preferred. Other preferred members of the subgroup are those wherein in at least one of the radicals represented by R or R$_1$ the carbon atom linked to the thioether sulphur atom is in turn linked to a carbon atom which is linked to at least three other carbon atoms. Representative members of the novel subgroup described are the isopropyl secondary octyl thioethers, the isopropyl secondary nonyl thioethers, the isopropyl secondary decyl thioethers, the isopropyl secondary undecyl thioethers, the isopropyl secondary dedecyl thioethers, etc., the secondary butyl secondary octyl thioethers, the secondary amyl secondary octyl thioethers, the secondary hexyl secondary octyl thioethers, the secondary hexyl secondary cetyl thioethers, the secondary octyl secondary dodecyl thioethers, secondary butenyl secondary octyl thioether, and isopropyl secondary octenyl thioether.

Another novel subgroup of thioethers which may be prepared in accordance with the process of the invention embraces those unsymmetrical thioethers, wherein at least one of the organic radicals linked to the thioether sulphur atom is halogenated, that is, contains at least one halogen atom, and wherein at least one of the organic radicals linked to the thioether sulphur atom contains at least five carbon atoms. The members of this subgroup of compounds may be represented by the general formula R—S—R$_1$, wherein R and R$_1$ are different saturated or unsaturated hydrocarbon or substituted hydrocarbon radicals at least one of which contains at least one halogen atom and at least one of which contains at least five carbon atoms. Preferred members are those wherein at least R or R$_1$ is a cycloaliphatic radical, particularly preferred members being those, of which the novel compound cyclohexyl chlorethyl thioether is representative, in which R is a cycloaliphatic radical containing at least five carbon atoms and R$_1$ is a halogen-containing aliphatic radical, preferably a monohalogenated alkyl radical wherein the halogen atom is linked to a primary carbon atom, and still more preferably a monohalogenated alkyl radical wherein the halogen atom is linked to a carbon atom which in turn is linked directly to the thioether sulphur atom. In general, the most useful of these halogenated unsymmetrical thioethers are those wherein the sum of the carbon atoms in R and R$_1$ is not greater than twenty-two. Representative thioethers of this novel subgroup are the amyl chlorethyl thioethers, the amyl bromethyl thioethers, the hexyl chlorethyl thioethers, the amyl chlorpropyl thioethers, the amyl brombutyl thioethers, the amyl chlorvinyl triethers, the amyl chlorallyl thioethers, the pentenyl chlorethyl thioethers, the pentenyl chlorvinyl thioethers, the heptyl chlorethyl thioethers, the octyl chlorpropyl thioethers, the nonyl chlorbutyl thioethers, the decyl chlorpropyl thioethers, and the cetyl chlorethyl thioethers. Representative of preferred thioethers of this subgroup are the cyclopentyl chlorethyl thioether, the cyclopentyl chlorvinyl thioethers, the cyclopentyl chlorallyl thioethers, the mono- and poly-alkyl cyclopentyl chlorethyl thioethers, the cyclohexyl chlorethyl thioethers, the alkylated cyclohexyl chlorethyl thioethers, the cyclohexyl chlovinyl thioethers, the cyclohexyl chlorallyl thioethers, the cyclohexyl chlorpropyl thioethers, the cycloheptyl chlorethyl thioethers, the halocyclopentyl chlorethyl thioethers and the like and their homologues, analogues and suitable substitution products. In the majority of the above-listed representative novel halogenated unsymmetrical thioethers, the halogen is represented as chlorine; it is, however, to be understood that the corresponding bromine, iodine and fluorine compounds are also contemplated, and that the compounds may contain, in either radical linked to the thioether sulphur atom, one or a plurality of the same or different halogen atoms.

Another subgroup of novel and valuable thioethers which are useful for many purposes and which may be prepared readily and in good yields in accordance with the process of the invention is obtained by reacting an unsaturated compound containing a terminal HC≡C—group (as in hexyne-1) with hydrogen sulphide or an organic thiohydroxy compound, such as a mercaptan. These thioethers are unsymmetrical and at least one of the organic radicals linked to the thioether sulphur atom contains at least five carbon atoms and is linked to the thioether sulphur atom by means of an unsaturated carbon atom of aliphatic character. For convenience, the thioethers of this subgroup may be represented by the general formula R—S—R$_1$, wherein R is a saturated or unsaturated hydrocarbon or substituted hydrocarbon radical of aliphatic, cycloaliphatic, aryl, aralkyl or alkaryl character, and R$_1$ is a different unsaturated hydrocarbon or substituted hydrocarbon radical which contains at least four, and preferably at least five carbon atoms and is linked to the thioether sulphur atom by means of an unsaturated carbon atom of aliphatic character. The radical represented by R$_1$ may be an aliphatic, cycloaliphatic, aralkynyl or alkenyl aryl hydrocarbon radical or such a hydrocarbon radical wherein one or more hydrogen atoms is replaced by a suitable substituent such as a halogen atom, an alkoxy group, an aryloxy group, an alkaryloxy group, an amido group, etc. Preferred members of this subgroup of unsaturated unsymmetrical thioethers are those wherein both R and R$_1$ are hydrocarbon radicals, wherein $R_1$ contains at least four carbon atoms and wherein the sum of the carbon atoms in R and $R_1$ does not exceed twenty-two. The following are representative members of the subgroup:

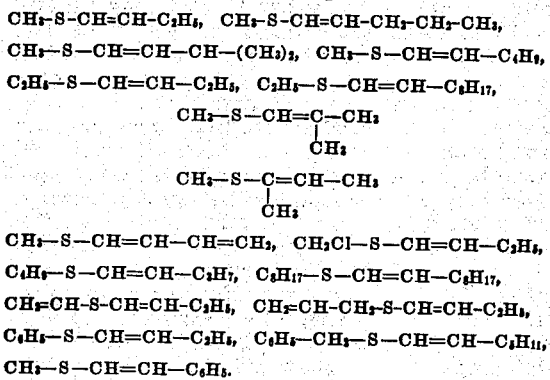

The thioethers and mercaptans prepared by the process of the invention are useful for a wide variety of purposes. They are valuable intermediates in the preparation of many useful organic sulphur-containing compounds. Some of them are useful as solvents for a wide variety of materials, such as for rubber, resins and the like. The thioethers, particularly the members of the novel subgroups described are of particular value in the production of detergents.

The examples cited both in the body of the specification and those which follow are offered solely for the purpose of further illustration and are not to be construed as limitative to the invention.

Example I

A mixture of 67.2 grams of cetene-1 which had been exposed to the air for some time and consequently contained peroxides, 22.3 grams of ethyl mercaptan and 0.2 gram of crystalline water-containing ferrous chloride was introduced into a steel autoclave. Immediately a spontaneous reaction occurred which was attended by considerable evolution of heat and a temporary increase in pressure to 2.8 atm. After allowing the mixture to stand for some time, it was collected and separated by fractional distillation. 87% of the ethyl mercaptan was found to have reacted, the product being cetyl ethyl sulphide having a M. P. of about 18° C.

Example II

Using the same materials as in Example I, but omitting the ferrous chloride, the experiment was repeated under the same conditions. No spontaneous reaction occurred. Then the mixture was heated at 100° C., for a period of about one hour, at a pressure of approximately 2.6 atm., and the reaction product analyzed. The product was n-cetyl ethyl sulphide which was obtained in a yield of only 61%.

Example III

A mixture of 26.1 grams of peroxide-containing octene-2 (B. P. 125° C., $n_D^{20}$ 1.4140), 21.4 grams of isopropyl mercaptan and 0.5 gram anhydrous ferrous chloride was stirred in an autoclave. A reaction promptly began which was evidenced by a temperature rise to 42° C. Subsequently the temperature was gradually raised to about 80° C. Analysis by fractional distillation revealed that 14.6 grams of secondary octyl isopropyl sulphide (a yield of 33%) together with some unconverted octene-2 were present in the product. Secondary octyl isopropyl sulphide is a new and useful compound.

Example IV

A mixture of 21.0 grams of propylene, 31.0 grams of ethyl mercaptan, 25.0 grams of peroxide-containing dioxane and 1.0 gram of $MgCl_2$ was permitted to stand at room temperature for several hours, following which the temperature was increased to 50° C. for a period of five hours. A yield of 60% of ethyl n-propyl sulphide (B. P. 117.5°-118.7° C.) was obtained.

Example V

The experiment described as Example IV was run in duplicate, except that no metal salt activating agent was present. The yield of ethyl n-propyl sulphide obtained was only 24%.

Example VI 31.2 grams of peroxide-containing hexene-1 was added, while stirring, to a mixture of 44.0 grams of thiophenol and 0.8 gram of ferrous chloride. Heat of reaction promptly was evidenced, and by controlling the rate of feed of the hexene-1 the temperature was kept at about 40° C. Subsequently after the reaction, the mixture was heated to about 80° C. for one hour. A yield of 32% of n-hexyl phenyl sulphide was obtained.

Example VII

Using twice the molecular quantity of ethyl mercaptan as butadiene-1.3 in the presence of peroxide-containing dioxane and ferrous chloride, a spontaneous reaction commenced. After heating at 40° C. for several hours in a sealed glass tube, sulphides resulting from the reaction of one molecule of the mercaptan with one molecule of the diolefine, and sulphides resulting from the reaction of two molecules of the mercaptan with one molecule of the diolefine were obtained in substantial yield.

Example VIII

A mixture of 32.8 grams of peroxide-containing cyclohexene and 32.8 grams of peroxide-containing dioxane was gradually added to a mixture of 38.6 grams of ethylene thiochlorhydrin (B. P. 115°-116° C.) and 0.5 gram of $CrCl_3$. A spontaneous reaction occurred, evidenced by considerable generation of heat. By cooling the temperature was kept at 40° C. A yield of 41% of cyclohexyl chlorethyl sulphide (a novel compound with B. P. 133° C.) was obtained.

Example IX

Peroxide-containing hexyne-1 and ethyl mercaptan were mixed cautiously in a one to two molecular ratio in the presence of 1% by weight of $MgCl_2$. The reaction commenced spontaneously and continued at about 50° C. Subsequently the mixture was heated for a short time to 90° C. Two sulphide products, both of which are novel compounds, were obtained; one (B. P. 77° C. at 16 mm. Hg) was the product of the reaction of one molecule of the hydrocarbon with one molecule of the mercaptan; the other, higher boiling, was the product of the reaction of two molecules of the mercaptan with one of the hydrocarbon. They were obtained in 15% and 8% yields respectively.

Example X

Hydrogen sulphide was introduced to a mixture of 45 grams of peroxide-containing cetene-1 and 0.5 gram of crystalline water-containing ferrous chloride. Absorption took place readily. After a period of 60 minutes further absorption of H₂S was slight. Di-n-cetyl sulphide was obtained in a 60% yield of a M. P. 61.8° C.

*Example XI*

A technical olefine mixture consisting of a fraction boiling between about 160° and 320° C. from a vapour phase cracking product of raw paraffin wax cakes was treated twice with 5% by weight of terrana at a temperature of 125° C. while stirring, whereupon the product was filtered and redistilled.

The refined olefine mixture was subsequently subjected to the action of ultraviolet light and oxygen by allowing it to stream along a mercury lamp and contacting it also with oxygen, thus causing the formation of peroxides. The resulting product contained 0.010 mg. equivalent of active oxygen per gram.

45.4 parts by weight of the refined and peroxide-containing olefine mixture thus obtained was mixed with 17.3 parts by weight of a mercaptan mixture boiling between about 5° and 100° C. (obtained as by-product in the refining treatment of a cracked distillate) and the mixture was introduced gradually within 2 hours into a reaction vessel, into which there was further introduced separately and gradually per 10 parts of the mixture 0.003 part by weight of a mixture consisting of 20% by weight of ferrous chloride and 80% by weight of kieselguhr. The contents of the reaction vessel were subsequently stirred, the temperature being maintained by cooling at about 30° C. After the reaction the product was stirred for a further 10 hours at room temperature.

The reaction product was freed from non-converted mercaptans by distillation. The desired thioethers remaining as residue were obtained in a yield of 75% by weight calculated on olefine mixture. When working under identical conditions, but using a non-refined olefine mixture the yield of thioethers amounted to only about 15% by weight.

When it is desired to produce sulphonium compounds from the resulting thioethers one may proceed as follows:

The thioether mixture is distilled in vacuo over about 2½% by weight of terrana and to 34 parts by weight of the distillate (consisting of refined thioethers) 12.6 parts by weight of dimethyl sulphate are added gradually, while stirring, at a temperature of 80° C. After a reaction period of some hours the reaction product (46.6 parts by weight) is neutralized with a solution of 0.24 parts by weight NaOH in about 4 parts by weight of a 50% alcohol and then mixed with 25 parts by weight benzine (boiling range 60–80° C.), as a result of which the product is saturated with benzine. The resulting mixture is extracted with benzine (boiling range 60–80° C.) with a view to eliminating hydrocarbons originating from the initial cracked distillate as well as any unconverted thioethers still present. From the extract obtained the benzine is recovered by distillation, the residue (11 parts by weight) being rejected as waste.

The raffinate is diluted, while stirring, with 36.5 parts by weight of water, whereupon the dissolved benzine is distilled off as azeotrope with alcohol and water, while stirring, the alcohol being thereby recovered as under layer from the distillate in the form of an aqueous alcohol of about 35% concentration. The solution of sulphonium compound thus freed of benzine and alcohol is then again neutralized with a little NaOH, subsequently decolorized with 1% of active carbon and finally concentrated to a concentration of, say, 50%.

Examination of the differing yields described in Examples I and II, and IV and V will reveal the activating effect the metal salt agents have on the addition reaction. The metal salt agents enable the operation at lower pressures and temperatures than otherwise possible, and materially increase the yield of the products.

While this invention has been described in a detailed manner with specific examples of suitable modes of executing the same, it is to be understood that modifications may be made without altering the spirit of the invention, and that no limitations, other than those imposed by the scope of the appended claims, are intended.

We claim as our invention:

1. A process for the production of a thioether containing a primary alkyl radical which comprises reacting an olefine of at least three carbon atoms per molecule having a terminal unsaturated carbon atom with an aliphatic mercaptan in the presence of an organic peroxide and ferrous chloride, whereby abnormal addition of said mercaptan to said olefine is effected.

2. A process for the production of a primary alkyl radical-containing addition compound of the class consisting of the mercaptans and thioethers which comprises reacting an olefine of at least three carbon atoms per molecule having a terminal unsaturated carbon atom with hydrogen sulphide in the presence of an organic peroxide and magnesium chloride, whereby abnormal addition of hydrogen sulphide to said olefine is effected.

3. A process for the production of a primary radical-containing addition compound of the class consisting of the mercaptans and thioethers which comprises reacting an aliphatic unsaturated hydrocarbon of at least three carbon atoms per molecule having a terminal unsaturated carbon atom with a compound of the formula R—SH, wherein R is a substituent of the group consisting of the hydrogen atom and the organic radicals, in the presence of an organic peroxide and a chloride of a metal of the group consisting of iron, chromium, manganese, molybdenum, vanadium, thorium, uranium, cerium, lanthanum, beryllium, magnesium, aluminum and osmium, whereby abnormal addition of the compound R—SH to said olefine is effected.

4. A process for the production of an addition compound of the class consisting of the mercaptans and thioethers containing a primary group which comprises reacting a hydrocarbon of at least three carbon atoms per molecule having at least one unsaturated linkage between two carbon atoms of aliphatic character, one of which unsaturated carbon atoms is a terminal carbon atom with a compound of the formula R—SH, wherein R is a substituent of the group consisting of the hydrogen atom and the organic radicals, in the presence of an organic peroxide and a chloride of a metal of the group consisting of iron, chromium, manganese, molybdenum, vanadium, thorium, uranium, cerium, lanthanum, beryllium, magnesium, aluminum and osmium.

5. A process for the production of an addition compound of the class consisting of the mercaptans and thioethers containing a primary group which comprises reacting a hydrocarbon of at least three carbon atoms per molecule having at least one unsaturated linkage between two carbon atoms of aliphatic character, one of which unsaturated carbon atoms is a terminal carbon atom with a compound of the formula R—SH, wherein R is a substituent of the group consisting of the hydrogen atom and the organic radicals, in the presence of an organic peroxide and a strong inorganic acid salt of a metal of the group consisting of iron, chromium, manganese, molybdenum, vanadium, thorium, uranium, cerium, lanthanum, beryllium, magnesium, aluminum and osmium.

6. A process or the production of an addition compound of the class consisting of the mercaptans and thioethers containing a primary group which comprises reacting an aliphatic unsaturated organic compound of at least three carbon atoms per molecule having a terminal unsaturated carbon atom with a compound of the formula R—SH, wherein R is a substituent of the group consisting of the hydrogen atom and the organic radicals, in the presence of an organic peroxide and a strong inorganic acid salt of a metal of the group consisting of iron, chromium, manganese, molybdenum, vanadium, thorium, uranium, cerium, lanthanum, beryllium, magnesium, aluminum and osmium.

7. A process for the production of an addition compound of the class consisting of the mercaptans and thioethers containing a primary group which comprises reacting an organic compound of at least three carbon atoms per molecule having at least one unsaturated linkage between two carbon atoms of aliphatic character, one of which unsaturated carbon atoms is a terminal carbon atom with a compound of the formula R—SH, wherein R is a substituent of the group consisting of the hydrogen atoms and the organic radicals, in the presence of an organic peroxide and a strong inorganic acid salt of a metal of the group consisting of iron, chromium, manganese, molybdenum, vanadium, thorium, uranium, cerium, lanthanum, beryllium, magnesium, aluminum and osmium.

8. A process for the production of an addition compound of the class consisting of the mercaptans and thioethers containing a primary group which comprises reacting an organic compound of at least three carbon atoms per molecule having at least one unsaturated linkage between two carbon atoms of aliphatic character, one of which unsaturated carbon atoms is a terminal carbon atom with a compound of the formula R—SH, wherein R is a substituent of the group consisting of the hydrogen atom and the organic radicals, in the presence of an organic peroxide and a metal salt of a strong inorganic acid which accelerates the desired addition reaction but is incapable of reacting with the R—SH compound to any substantial extent under the operating conditions.

9. The isopropyl secondary octyl thioethers.

10. The unsymmetrical thioethers of the formula R—S—$R_1$, wherein R is the isopropyl radical and $R_1$ is a secondary alkyl radical which contains at least eight carbon atoms.

11. The unsymmetrical thioethers of the formula R—S—$R_1$, wherein R is an alkyl radical containing from 3 to 5 carbon atoms and linked to the sulphur atom by means of a carbon atom which is turn is directly linked to at least two other carbon atoms, and $R_1$ is an alkyl radical containing at least 8 carbon atoms and linked to the sulphur atom by a carbon atom which in turn is directly linked to at least two other carbon atoms.

12. The unsymmetrical thioethers of the formula R—S—$R_1$, wherein R and $R_1$ are hydrocarbon radicals having a different number of carbon atoms at least one of which is an alkyl radical and contains at least 8 carbon atoms and each of which is linked to the sulphur atom by means of a carbon atom which in turn is directly linked to at least two other carbon atoms.

13. The unsymmetrical thioethers wherein at least one of the organic radicals linked to the thioether sulphur atom is a radical of the group consisting of the aliphatic and cycloaliphatic radicals containing at least eight carbon atoms and wherein each of the two organic radicals linked to the thioethersulphur atom is linked thereto by means of a carbon atom which in turn is directly linked to at least two other carbon atoms.

JOHAN MARIUS HOEFFELMAN.
RINKE BERKENBOSCH.